Aug. 8, 1933.   C. P. WEBER   1,921,400
DIVIDED MIDDLE RING COUPLING
Filed March 28, 1931   3 Sheets-Sheet 1

INVENTOR
Clifford P. Weber
BY
Louis Prevost Whitaker
ATTORNEY

Aug. 8, 1933.  C. P. WEBER  1,921,400
DIVIDED MIDDLE RING COUPLING
Filed March 28, 1931   3 Sheets-Sheet 2

INVENTOR
Clifford P. Weber
BY
Louis Prevost Whitaker
ATTORNEY

Aug. 8, 1933.  C. P. WEBER  1,921,400

DIVIDED MIDDLE RING COUPLING

Filed March 28, 1931  3 Sheets-Sheet 3

INVENTOR
Clifford P. Weber
BY
Louis Prevosh Whitaker
ATTORNEY

Patented Aug. 8, 1933

1,921,400

UNITED STATES PATENT OFFICE 1,921,400

DIVIDED MIDDLE RING COUPLING

Clifford P. Weber, Bradford, Pa., assignor to S. R. Dresser Manufacturing Company, Bradford, Pa., a Corporation of Pennsylvania Application March 28, 1931. Serial No. 525,908

7 Claims. (Cl. 285—132)

My invention consists in the novel features hereinafter described, reference being had to the accompanying drawings which illustrate two embodiments of the invention, selected by me for purposes of illustration, and the said invention is fully disclosed in the following description and claims.

The object of my invention is to provide a coupling for plain unthreaded ends of pipe sections, including a middle ring or sleeve, which is provided at each end with packing engaging portions, and is divided transversely into two sections, the adjacent inner end portions of which are assembled in association with a filler ring, or filler plate, of greater diameter than said meeting edges of the middle ring sections, and provided on opposite faces with annular packing recesses, in which are placed annular gaskets to be engaged by the edges of the middle ring sections. The divided middle ring and filler ring or plate and its gaskets are employed in conjunction with clamping rings engaging end packings in the end recess of the middle rings, and bolts and nuts engaging the clamping rings, and when these bolts and nuts are drawn up, a tight joint is formed with the pipe sections at each end of the middle ring, and simultaneously a tight joint is effected between the inner ends of the middle ring sections and the filler ring (or filler plate).

My invention is extremely advantageous for use for the purpose of sectionalizing a distribution system. For example, in changing a system from manufactured gas to natural gas (or vice versa) it is necessary to change the adjustments on all the gas burners of the system, and as obviously this cannot be done simultaneously, small sections of the system must be isolated while the adjustments are made, or other necessary work is to be done. Where my improved coupling has been placed in the lines at proper points, a particular section can be cut off by simply loosening the coupling bolts of my couplings at the opposite ends of the section, removing the filler rings, and replacing them with filler plates and tightening the bolts. When the adjustments (or other work) are or is completed, the filler plates can be removed, and the filler rings replaced in the same manner. It will also be obvious that any line already laid can be equipped with my improved couplings, by simply sawing out of a pipe section intermediate the pipe joints, a short piece, to produce a gap sufficiently long to permit the sections of my divided middle ring to be slipped over the ends of the pipe. It is therefore not necessary to disturb the pipe coupling means at the ends of the pipe sections which may be of any character.

My invention is also extremely advantageous where it is desired to instal in a line already laid, insulating couplings for the prevention of electrolytic action on the pipes, in which case one section of the middle ring is made of greater internal diameter than the other, to accommodate the insulating cap extension used on one of the pipe sections, and the grooves in the filler ring, and the gaskets therefor are made of sufficient width to accommodate the difference in the diameters of the middle ring sections. My invention also permits of the manufacture of an insulating coupling in which the divided middle ring is formed entirely of wrought metal, as wrought iron or steel.

Referring to the accompanying drawings.

Referring to Figs. 1 to 6 of the drawings, 1, 1, represent the plain unthreaded ends of two adjacent pieces of pipe in a pipe line, to be united by my coupling. If the coupling is to be applied at the time the pipes are laid in the line, the parts, 1, may be ordinary plain end pipe sections which are conveniently spaced a sufficient distance apart to permit the removal of the filler ring, and the insertion of a filler plate, and vice versa. If the coupling is to be applied after the line is laid, a piece a little longer than the length of one of the middle ring sections, is sawed out of a pipe section between its ends, as in such case the adjacent ends of the sections, 1, 1, must be separated far enough to permit the sections of the divided middle ring to be placed in position around the ends of the pipe sections. The middle ring is formed in two sections, 2, 2a, divided centrally and transversely. They may be conveniently formed separate, or they may be formed by making a complete middle ring and sawing or otherwise severing it into two sections. The outer end of each middle ring section is provided with an end packing receiving recess, 3, adjacent to which is a cylindrical portion, 4, but slightly larger than the exterior diameter of the pipe sections with which the coupling is to be used, and the inner end portion of each middle ring section, indicated at 5, is preferably of slightly larger diameter both internally and externally than the cylindrical portion, 4. The sections of the middle ring are preferably formed of wrought metal either iron or steel, but they could be made of cast metal if desired.

Figure 1:
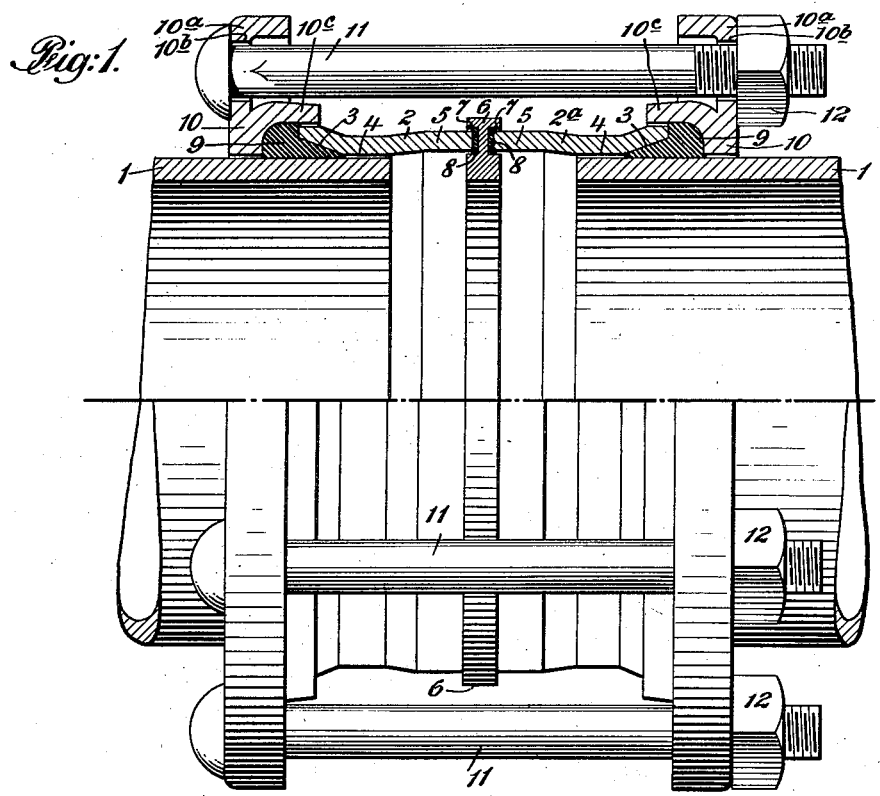
Fig. 1 is a side elevation, partly in section, showing my divided middle ring coupling installed in connection with two pipe sections, and with a centrally located filler ring.
Figure 2:
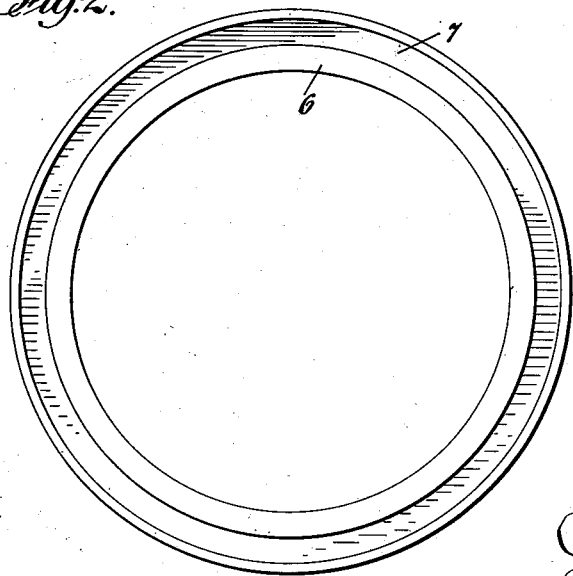
Fig. 2 is a plan view of the filler ring, detached.
Figure 3:
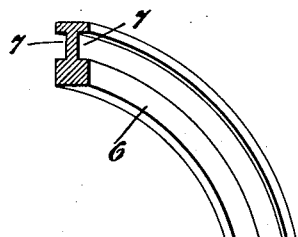
Fig. 3 is a perspective view, partly in section, of a portion of the filler ring.

6 represents a filler ring which is preferably formed of wrought metal, as iron or steel, in any suitable manner, although it also could be made of cast metal. The filler ring has its exterior diameter slightly greater than that of the central portion, 5, of the middle ring sections, and its interior diameter will be substantially identical with the interior diameter of the pipe sections. The filler ring is provided on each face with means for maintaining the inner ends of the middle ring section and the annular packing rings hereafter referred to in coaxial relation, consisting in this instance of a packing receiving groove, indicated at 7—7, into which is inserted a flat annular packing ring, or gasket, 8, of compressible material, preferably of rubber, although any other suitable packing material may be employed which will make a perfectly tight joint with the inner ends of the middle ring sections. The recesses, 7, are of slightly greater width than the thickness of the middle ring sections, and are so located that when assembled between the sections of the middle ring, as shown in Fig. 1, the inner ends of the middle ring sections will engage the centrally located portions of the gaskets, 8. 9, 9, represent end packing rings of rubber or other suitable packing material adapted to surround the ends of the pipes and enter the packing recesses, 3, at the outer ends of the middle ring sections. 10, 10, represent clamping rings, each of which has a plate member, 10a, provided with a circular series of bolt holes, 10b, and said rings are constructed so as to press the end packing rings, 9, into the end packing recesses of the divided middle ring and between the middle ring and the adjacent pipe sections. In the form shown in Fig. 1, each clamping ring is shown provided with an annular flange portion, 10c, forming a packing recess within the same, to engage portions of the end packing rings, 9, which extend outside of the packing recesses in the middle ring, but my invention is not limited to the specific construction of the end packing recesses, clamping rings and end packing rings herein shown.

Assuming that it is desired to insert my divided middle ring coupling in a pipe line already laid, a portion of the pipe section is sawed out, as previously stated, the clamping rings are inserted in the space between the sections, 1, 1, of the pipe, and moved laterally into engagement with the pipe sections, the end packing rings are placed over the pipe ends and pushed outwardly from the ends thereof, the sections of the divided middle ring are placed in engagement with the opposite ends of the pipe, and the filler ring, with the gaskets, 8, 8, in the grooves, 7, 7, thereof, is placed in position between the inner end portions, 5, of the middle ring sections. The end packing rings are then brought up into the end packing recesses of the middle ring, the clamping rings are moved into engagement with the packing rings, 9, and through bolts, 11, are passed through the bolt apertures, 10b, of the clamping rings, and provided with nuts, 12, which are screwed up, as shown in Fig. 1. It will be noted that as the bolts are tightened, the end packing rings, 9, are forced into the end packing recesses of the middle ring sections, and the middle ring sections themselves are forced inwardly so as to bring their inner ends, 5, 5, into sealing engagement with the gaskets or packing rings, 8, 8, of the filler ring, thus making a perfectly tight joint between the sections of the middle ring, and simultaneously making tight joints between the outer end portions of the middle ring sections and the adjacent pipe sections, 1.

Figure 4:
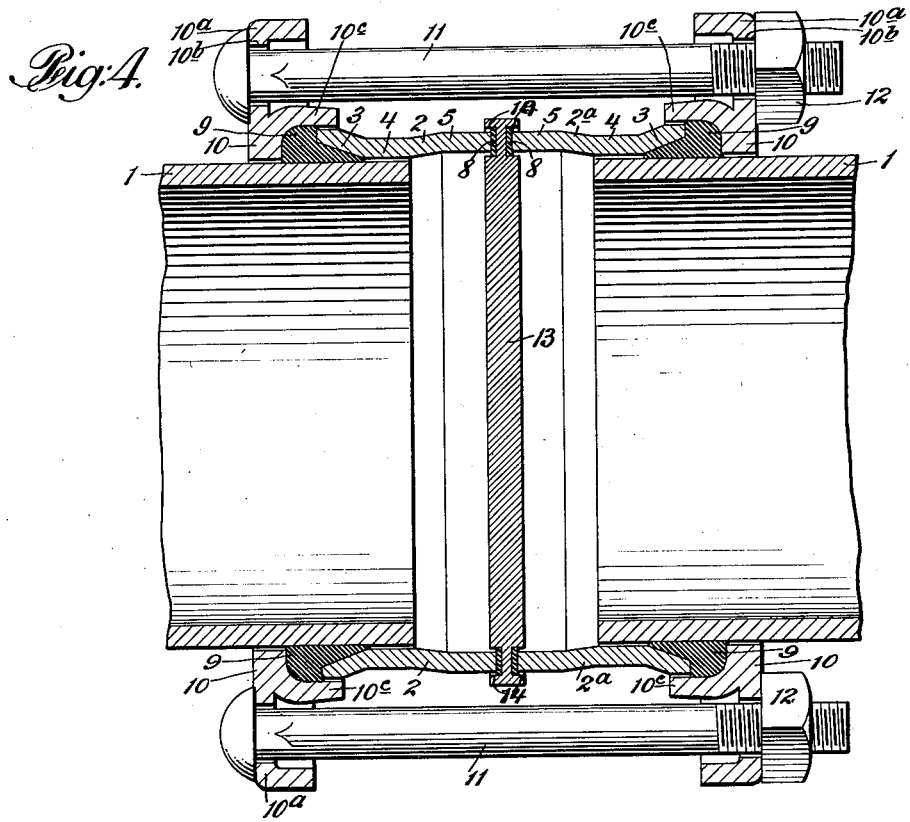
Fig. 4 is a vertical sectional view of the coupling illustrated in Fig. 1 and connected pipes, showing the filler ring replaced by a filler plate.
Figure 5:
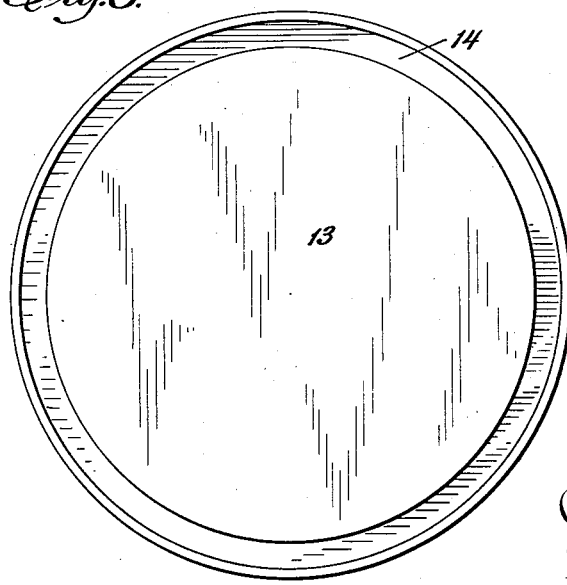
Fig. 5 is a plan view of the filler plate, detached.
Figure 6:
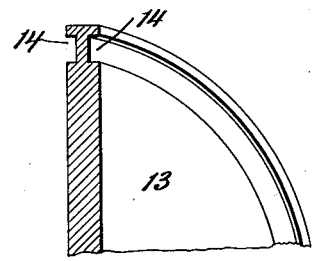
Fig. 6 is a perspective view, partly in section, of a portion of the filler plate.

It will be noted that my divided middle ring coupling can thus be applied to any kind of a pipe section between the ends thereof, regardless of the form of joint which is used to connect the ends of the pipe sections in the line. In other words, my coupling can be installed in an intermediate portion of a pipe having screw threaded ends or bell and spigot ends, or ends connected by welding, or by any other form of coupling. Obviously, if my coupling is applied at the time the pipe line is being laid, it can be used to connect the adjacent ends of plain end pipe sections, or if other types of pipe sections are employed, a pipe section can be sawed in two at any intermediate point and the coupling installed in the manner indicated in Fig. 1.

Where my improved coupling is inserted for the purpose of sectionalizing a distribution system, I employ, in connection therewith a filler plate, one of which is indicated at 13, and is shown in Figs. 4, 5 and 6. This plate, which is preferably made of wrought iron or steel, but which may be made of cast iron if preferred, is of circular form having an exterior diameter substantially identical with that of the corresponding filler ring, 6, and is provided on its opposite faces with annular grooves, 14, 14, corresponding with the grooves, 7, 7, of the filler ring, and adapted to receive the same annular packing rings, or gaskets, 8, 8. If it is desired to shut off a portion of the line at the point where one of my couplings has been installed, as for the purpose of adjusting the gas burners connected with a portion of the pipe system, it is only necessary to loosen the bolts, 11, of the coupling sufficiently to permit the inner ends of the middle ring sections to be disengaged, and to remove certain of the bolts, so as to permit the filler ring to be removed. The packing gaskets, 8, may then be inserted in the annular recesses, 14, of the filler plate, 13 (or other packing gaskets may be provided for the filler plate if desired) and the filler plate is replaced in the position formerly occupied by the filler ring, between the inner ends of the middle ring sections, the removable bolts are replaced, and the nuts of all the bolts are again tightened, as indicated in Fig. 4, thus making a perfectly tight joint at each end of the middle ring, and between the inner ends of the middle ring sections and the filler plate, which forms an absolute cut off between the portions of the pipe line on opposite sides of the plate. As soon as the adjustments have been completed, or other work performed, when it is desired to again connect the portions of the pipe line on opposite sides of the filler plate, it is only necessary to again loosen the bolts of the coupling, remove the filler plate, and insert the filler ring in lieu thereof, and tighten the bolts, as in Fig. 1, when the line is restored to communication with full capacity as before.

It will be obvious that by installing my coupling at the desired points in a pipe line, sections of the line can be disconnected at any time for the purpose of adjustments or repairs, by simply substituting a filler plate for the filler ring in the coupling, and the line can be restored to operation at full capacity by substituting the filler ring for the filler plate.

It will be noted that in my coupling, the sections of pipe which are connected may move longitudinally with respect to the coupling to accommodate contraction and expansion, and may also assume positions slightly angularly with respect to each other without affecting the tightness of the joint in any way.

Figure 7:
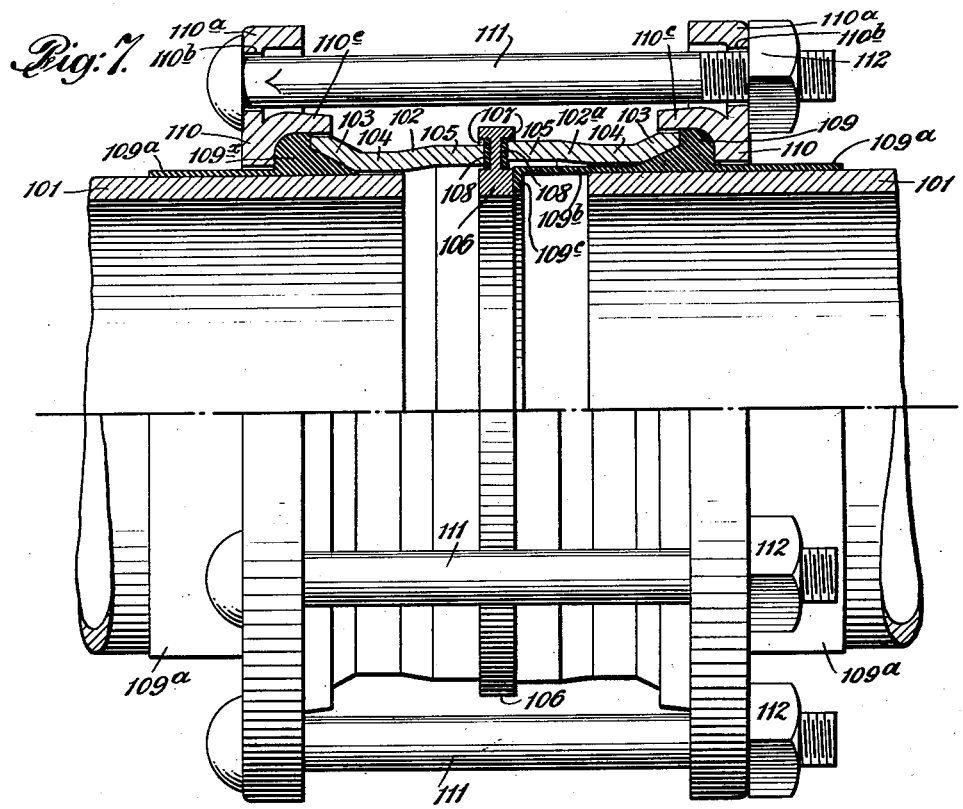
Fig. 7 is a view similar to Fig. 1, showing my invention applied to an insulating coupling.
Figure 8:
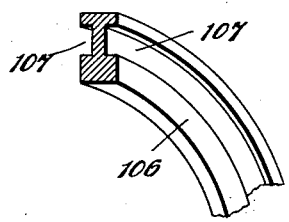
Fig. 8 is a perspective view, partly in section, of the filler ring, shown in Fig. 7.

In Figs. 7 and 8 I have shown a slight modification of my coupling, which is particularly designed for the purpose of permitting the insertion of an insulating coupling at any desired point in a pipe line, already laid, regardless of the character of the couplings which may have been employed for the connection of the pipe sections forming the line. The object of such insulating pipe couplings is to insulate the adjacent pipe sections which have been connected, from each other, so as to prevent the passage of electric currents along the line, and the electrolytic destruction of the pipes, which is likely to occur at points where any large accumulation of electrolytic energy is discharged into the surrounding earth. For purposes of such insulation it is customary to provide one of the end packing rings, indicated at 109, in Fig. 7, with a sleeve portion, 109a, surrounding the pipe and extending through the aperture in the clamping ring, 110, and with a sleeve portion, 109b, extending into the coupling around and beyond the end of the pipe section, and provided with an inwardly extending annular flange portion, these sleeves being formed of rubber or other suitable insulating material, and conveniently formed integral with the packing ring, 109. The end packing ring, 109x, at the other end of the coupling is ordinarily provided with a sleeve, 109a, extending outwardly therefrom, through the clamping ring, 110, but is not provided ordinarily with the inwardly extending sleeve, as only one of these is necessary to insure complete insulation. In order to accommodate the inwardly extending sleeve, 109b, it is necessary that the interior diameter of the portion of the middle ring surrounding this insulating sleeve shall be sufficiently larger than that of the other end portion of the middle ring to compensate for the thickness of the insulating sleeve, and at the same time permit the same amount of lateral movement of the inner end of the pipe at each end of the coupling to accommodate slight inaccuracies of alignment.

In adapting my coupling for this purpose I form the two sections, 102 and 102a, of the divided middle ring with their inner end portions, 105, of slightly different diameters, the inner end of the middle ring section, 102a, being sufficiently larger than the corresponding end of the section, 102, to accommodate the thickness of the insulating sleeve, 109b. I also form the lateral grooves or recesses, 107, in the filler ring, 106, and the gaskets, 108, of sufficient width to accommodate the slight difference in the diameters of the two sections of the divided middle ring, as clearly illustrated in Fig. 7. The middle ring sections may be formed separately or they may be conveniently formed by making complete middle rings with the central portions thereof in two different diameters for the same standard size, separating them transversely and centrally and using a section of smaller diameter and a section of larger diameter together in the manner illustrated in Fig. 7. The middle ring sections are preferably made of wrought metal, iron or steel, but obviously they could be made of cast metal if found desirable. The other parts of the coupling illustrated in Fig. 7 which are identical with those previously described with reference to Fig. 1, are given the same numerals with the addition of 100 in order to avoid repetition.

It will be understood that when it is desired to insert insulation between adjacent pipe sections at any point in a pipe line already laid, it is only necessary to saw out a portion of a pipe section between its ends and insert the coupling parts as shown in Fig. 7, including the insulating sleeves, the divided middle ring, filler ring, clamping rings and bolts, all of which can be inserted and applied to the adjacent ends of the pipes through the aperture formed by the removal of a short portion thereof and when the bolts are tightened up the end packings will form a tight joint between the outer ends of the middle ring sections and the adjacent sections of pipe, 101, and simultaneously the inner ends of the middle ring sections will form a tight joint with the filler ring while the insulating sleeves will be held in position to thoroughly insulate the pipe ends from each other and from the coupling at all times. It will be noted that the coupling permits the slight endwise movement of either or both of the pipe sections therein to accommodate expansion and contraction due to changes of temperature.

What I claim and desire to secure by Letters Patent is:

1. In a coupling of the kind described, the combination with a middle ring divided transversely into sections, of a removable filler element provided with unperforated marginal portions to be interposed between the inner ends of the middle ring sections, annular packings interposed between the opposite faces of said unperforated marginal portions of the filler element and the adjacent ends of the middle ring sections, the marginal portions of the filler element being provided with annularly disposed portions for maintaining the said annular packings and the inner ends of the middle ring sections in coaxial relation, end packings for the outer ends of the middle ring sections, clamping rings for engaging said end packings, and bolts extending from one of said clamping rings to the other and lying outside of the outer edges of said removable filler element and the outer edges of the interposed annular packings, contiguous thereto, and nuts on said bolts, whereby removable filler plates with and without a central aperture may be interchanged.

2. In a coupling of the kind described, the combination with a middle ring divided transversely into sections, of a removable filler element provided on opposite faces with annular recesses, annular packings in said recesses for engaging the inner ends of said middle ring sections, end packing rings, clamping rings, and clamping bolts and nuts for engaging said clamping rings, and compressing the end packings and simultaneously forcing the middle ring sections into sealing engagement with the packings in the recesses of said filler element.

3. In a coupling of the kind described, the combination with a middle ring divided transversely into sections and provided with end packing engaging portions, a filler ring having an external diameter greater than that of the inner ends of said middle ring sections, and providing a central aperture in communication with the pipes to be connected, said filler ring having its opposed faces provided with annular recesses, and annular packings therein to engage the inner ends of the middle ring sections, end packings, clamping rings and clamping bolts and nuts connecting said clamping rings.

4. In a coupling of the kind described, the combination with a middle ring divided transversely into sections and provided with end packing engaging portions, a removable filler plate for separating the pipe sections to be joined by the coupling, said plate being provided on opposite faces with annular packing recesses, annular packings in said recesses to engage the inner ends of the middle ring sections, end packings, clamping rings, and clamping bolts and nuts for connecting said clamping rings to compress said end packings and simultaneously force the middle ring sections into sealing engagement with the packings in the recesses of said filler plate.

5. In a coupling of the kind described, the combination with a middle ring divided transversely into two sections, the inner ends of one of said sections being of different greater diameters than the other to accommodate insulation surrounding the adjacent pipe end, and the outer end of each section being provided with end packing engaging portions, a filler ring located between said middle ring sections, and provided with annular recesses of a width sufficient to receive the inner end portion of either middle ring section, packings in said recesses, end packings, clamping rings, and clamping bolts and nuts for connecting said clamping rings, to compress said end packings and simultaneously force the inner ends of said middle ring sections into sealing engagement with the packing in the recesses of said filler plate.

6. In a coupling of the kind described, the combination with a middle ring, divided transversely into sections, each provided at its outer end with end packing engaging portions, a filler member to be inserted between the inner ends of said middle ring sections, an annular packing interposed between each middle ring section and the filler member, end packings, and clamping means for compressing said end packings and simultaneously forcing said middle ring sections and said filler member into sealing engagement with said interposed packings.

7. In a coupling of the kind described, the combination with a middle ring comprising two sections, each section being provided at its outer ends with end packing engaging portions, the inner end portion of one section being of greater internal diameter than the other, a filler ring located between the inner ends of said middle ring sections, annular packings interposed between said filler ring and the inner ends of said middle ring sections, a pair of end packing rings, one of which is provided adjacent to its inner edge with a pipe engaging insulating sleeve to extend within the inner end portion of the middle ring section of greater diameter, clamping rings for engaging said end packing rings, each of said end packing rings being provided adjacent to its outer edge with a pipe engaging insulating sleeve adapted to extend between the adjacent pipe and the inner edge of the adjacent clamping ring, and clamping bolts and nuts for connecting said clamping rings to compress said end packings and simultaneously force said middle ring sections and said filler into sealing engagement with said interposed annular packings.

CLIFFORD P. WEBER.